(12) United States Patent
Kwon

(10) Patent No.: US 11,588,879 B2
(45) Date of Patent: *Feb. 21, 2023

(54) FILE TRANSMISSION METHOD AND SYSTEM PERFORMING THE SAME

(71) Applicant: Heung Yeol Kwon, Seoul (KR)

(72) Inventor: Heung Yeol Kwon, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/376,229

(22) Filed: Jul. 15, 2021

(65) Prior Publication Data

US 2021/0344743 A1 Nov. 4, 2021

Related U.S. Application Data

(63) Continuation of application No. 16/189,747, filed on Nov. 13, 2018, now Pat. No. 11,122,107.

(30) Foreign Application Priority Data

Nov. 13, 2017 (KR) .................. 10-2017-0150525

(51) Int. Cl.
H04L 67/06 (2022.01)
H04L 69/14 (2022.01)
H04L 9/40 (2022.01)

(52) U.S. Cl.
CPC .......... H04L 67/06 (2013.01); H04L 63/0464 (2013.01); H04L 69/14 (2013.01)

(58) Field of Classification Search
CPC ...... H04L 67/06; H04L 69/14; H04L 63/0464
See application file for complete search history.

(56) References Cited

U.S. PATENT DOCUMENTS

| 7,277,958 | B2* | 10/2007 | Chung | ................. H04L 69/329 709/215 |
|---|---|---|---|---|
| 7,827,049 | B2 | 11/2010 | Dogan et al. | |
| 9,065,595 | B2 | 6/2015 | Harrang et al. | |
| 9,100,405 | B2 | 8/2015 | Twitchell, Jr. | |
| 9,596,323 | B2 | 3/2017 | Luby et al. | |
| 10,110,694 | B1 | 10/2018 | Watson et al. | |
| 10,306,272 | B2 | 5/2019 | Yamagishi | |

(Continued)

FOREIGN PATENT DOCUMENTS

| KR | 10-2003-0019900 A | 3/2003 |
|---|---|---|
| KR | 10-2014-0061109 A | 5/2014 |
| KR | 10-0521361 B1 | 10/2015 |

Primary Examiner — Oanh Duong
(74) Attorney, Agent, or Firm — Bridgeway IP Law Group, PLLC; Sang Ho Lee; Hyun Woo Shin

(57) ABSTRACT

Provided a is method for managing file transmission. A file transmission method includes receiving, by a file transmission system, a request for transmitting a file to a reception side from a transmission side, setting transmission paths for transmitting the file via data centers present between the transmission side and the reception side, determining a splitting reference used for splitting the file into a plurality of fragments for the respective transmission paths, and individually transmitting the file fragments split according to the splitting reference along the transmission paths. Since files are split into a plurality of fragments and the fragments are simultaneously transmitted to several networks in a distributed manner, security may be strengthened and a bandwidth may be temporarily expanded, remarkably enhancing a transfer rate.

17 Claims, 14 Drawing Sheets

(56) References Cited

U.S. PATENT DOCUMENTS

| | | | |
|---|---|---|---|
| 11,122,107 B2 * | 9/2021 | Kwon | .................. H04L 67/06 |
| 2003/0078964 A1 | 4/2003 | Parrella et al. | |
| 2004/0103208 A1 | 5/2004 | Chung et al. | |
| 2007/0260747 A1 | 11/2007 | Samzelius et al. | |
| 2011/0022684 A1 | 1/2011 | Nakao | |
| 2011/0179449 A1 | 7/2011 | Ganesan et al. | |
| 2014/0359084 A1 | 12/2014 | Liao et al. | |
| 2015/0350299 A1 | 12/2015 | Pineas | |
| 2016/0306879 A1 | 10/2016 | Logue et al. | |
| 2016/0373209 A1 | 12/2016 | Harrang et al. | |
| 2017/0041375 A1 | 2/2017 | Panchapakesan et al. | |
| 2017/0214623 A1 | 7/2017 | Finkelstein | |
| 2017/0272209 A1 | 9/2017 | Yanovsky et al. | |
| 2017/0346881 A1 | 11/2017 | Zhang | |
| 2017/0351666 A1 | 12/2017 | Loring et al. | |
| 2017/0353516 A1 | 12/2017 | Gordon | |
| 2019/0268406 A1 | 8/2019 | Avraham et al. | |
| 2020/0019535 A1 | 1/2020 | Parker | |

\* cited by examiner

FILE TRANSMISSION METHOD AND SYSTEM PERFORMING THE SAME

CROSS-REFERENCE TO RELATED APPLICATION

This application is a continuation application of the U.S. application Ser. No. 16/189,747 filed on Nov. 13, 2018, which claims the priority and benefit of Korean Patent Application No. 10-2017-0150525 filed on Nov. 13, 2017, with the Korean Intellectual Property Office, and the disclosures of the above-identified applications are incorporated herein by reference.

BACKGROUND OF THE INVENTION

1. Field of the Invention

The present invention relates to a method for managing file transmission and, more particularly, to a structure for distributed transmission to a multi-network for high-speed transmission of a file.

2. Description of the Related Art

Today organizations such as corporations and government agencies must transmit large files between different cities or countries that are far away from each other, but there is no special way to transmit large files. Even if a bandwidth between a starting point and a destination is 10 MB, only less than 5% of 10 MB per second may be used in actual long-distance transmission, and thus, if a 10 TB file is transmitted, transmission of the file takes about 200 days or more using only 5 Mbps, 5% of 100 Mbps. Even if 100% of the rate of 100 Mbps of the bandwidth is used, it takes about 10 days.

A method of splitting a file to transmit file fragments in parallel using HTML5 at a high speed has been known but the transmitted file may be easily exposed and it is well known that HTTPS is very vulnerable to hacking using a forged certificate.

In addition, as the file capacity is larger and a transmission time is longer, the transmission may be interrupted many times due to a network failure during transmission and transmission may not be completed due to numerous natural or artificial file alterations. Also, even if the file is transmitted again from the beginning, the same situation may be repeated and the transmission may never be completed. Currently, the only way to be selected by a large number of organizations, which are in a situation in which files are to be transmitted, may be copying the files in a physical storage device and actually moving and copying the corresponding device.

As the transmission of files becomes more frequent, the purchase of such physical storage devices, physical transportation of equipment, and labor costs required for transmission management are also rapidly increasing, and a potential risk such as file loss and leakage during transportation, as well as human errors that may occur during copying and verifying processes by people and an increase in re-transmission cost and overall transmission time due to loss of files, have emerged as a serious problem.

In order to transmit large files between long distances, a file may be split using FTP, UDP, and the like, and transmitted in parallel, whereby close to 100% of a bandwidth may be used in the transmission between long distances. However, in order to use FTP and UDP, a port must be opened to be exposed to security thread, which, thus, may not be widely used.

SUMMARY

An aspect of the present invention may remarkably improve a security threat of protocols used in the related art file transmission, a limitation of a bandwidth, an automated response to a fault that occurs during a transmission process, inconvenience in use, and the like, and improve a transfer rate of a file.

According to an aspect of the present invention, a file transmission method may include: receiving, by a file transmission system, a request for transmitting a file to a reception side from a transmission side; setting transmission paths for transmitting the file by way of data centers present between the transmission side and the reception side; determining a splitting reference used for splitting the file into a plurality of fragments for the respective transmission paths; and individually transmitting the file fragments split according to the splitting reference along the transmission paths.

The data centers may be classified on the basis of areas where the data centers are located, and the setting of the transmission paths may include determining data centers of pass-through areas to transmit the file.

The setting of the transmission paths may include determining data centers of the pass-through areas according to geographical locations of the areas where the transmission side and the reception side are located and distances therebetween.

The setting of the transmission paths may include setting a plurality of transmission paths by the pass-through areas and the file transmission method may further include: providing a list of the plurality of determined paths according to transmission time and transmission cost.

The transmitting may include transmitting the file fragments using a hyper text transfer protocol (HTTP).

The transmitting may include transmitting the file fragments dividedly through a plurality of separate communication lines when transmitting the file fragments between the transmission side and a first data center on the transmission paths or between a last data center on the transmission paths and the reception side.

The first data center may be a data center of an area where the transmission side is located, and the last data center may be a data center of an area where the reception side is located.

The receiving may include merging a plurality of files into a single file when a request for transmitting the plurality of files equal to or higher than a reference is received, and the determining of the splitting reference may include determining a splitting reference used for splitting the merged single file for the respective transmission sections.

The file transmission method may further include encrypting the split file fragments, and the transmitting may include transmitting the encrypted file fragments to the first data center.

The file transmission method may further include: decrypting the split file fragments, and the transmitting may include decrypting the encrypted file fragments received from the last data center on the transmission paths and transmitting the decrypted file fragments to the reception side.

The file transmission method may further include: comparing a transmission state of the file fragments from the transmission side and a reception state of the file fragments at the reception side and providing information regarding the transmission state of the file according to a comparison result.

According to another aspect of the present invention, a file transmission system may include: a transmission request receiving unit receiving a request for transmitting a file to a reception side from a transmission side; a transmission path setting unit setting transmission paths for transmitting the file by way of data centers present between the transmission side and the reception side; a file splitting reference determining unit determining a splitting reference used for splitting the file into a plurality of fragments for the respective transmission paths; and a file transmitting unit individually transmitting the file fragments split according to the splitting reference along the transmission paths.

DETAILED DESCRIPTION

The following description illustrates only a principle of the present invention. Therefore, those skilled in the art may implement the principle of the present invention and devise various apparatuses included in the spirit and scope of the present invention although not clearly described or illustrated in the present specification. In addition, it is to be understood that all conditional terms and embodiments mentioned in the present specification are obviously intended only to allow those skilled in the art to understand a concept of the present invention in principle, and the present invention is not limited to embodiments and states particularly mentioned as such.

The above-mentioned objects, features, and advantages will become obvious from the following detailed description provided in relation to the accompanying drawings. Therefore, those skilled in the art to which the present invention pertains may easily practice a technical idea of the present invention.

Further, in describing the present invention, in the case in which it is judged that a detailed description of a well-known technology associated with the present invention may unnecessarily make unclear the gist of the present invention, it will be omitted. Hereinafter, various embodiments of the present invention will be described in detail with reference to the accompanying drawings.

Figure 1:
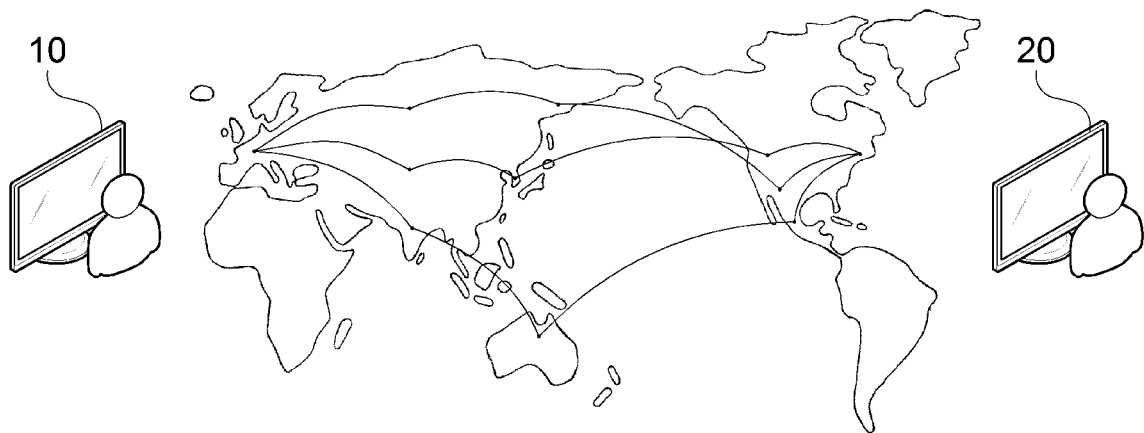
FIGS. 1 and 2 illustrate a system configuration in which a file transmission method according to an embodiment of the present invention is performed.

FIG. 1 is a diagram illustrating a system environment in which a file transmission method according to an embodiment of the present invention is performed.

Referring to FIG. 1, a file transmission system 100 according to the present embodiment transmits a file between a transmission side 10 and a reception side 20 existing in each country around the world, and more rapidly and safely transmits a file from the transmission side 10 to the reception side 20 together with a data center, a hub system, and the like, located in each country.

The file transmission system 100 according to the present embodiment forms a single data logistics network 30 including data centers located in respective countries and established according to purposes of corporations or organizations to store and distribute big data and data hubs processing information collected from various sources and distinguishes the data centers and the data hubs by area to transmit a file between the transmission side 10 and the reception side 20.

That is, the file transmission system 100 configures the single logistics network 30 with the data centers and the data hubs without differentiating between operating subjects thereof and sets a transmission path according to a local reference of the transmission and reception sides 10 and 20.

Figure 2:
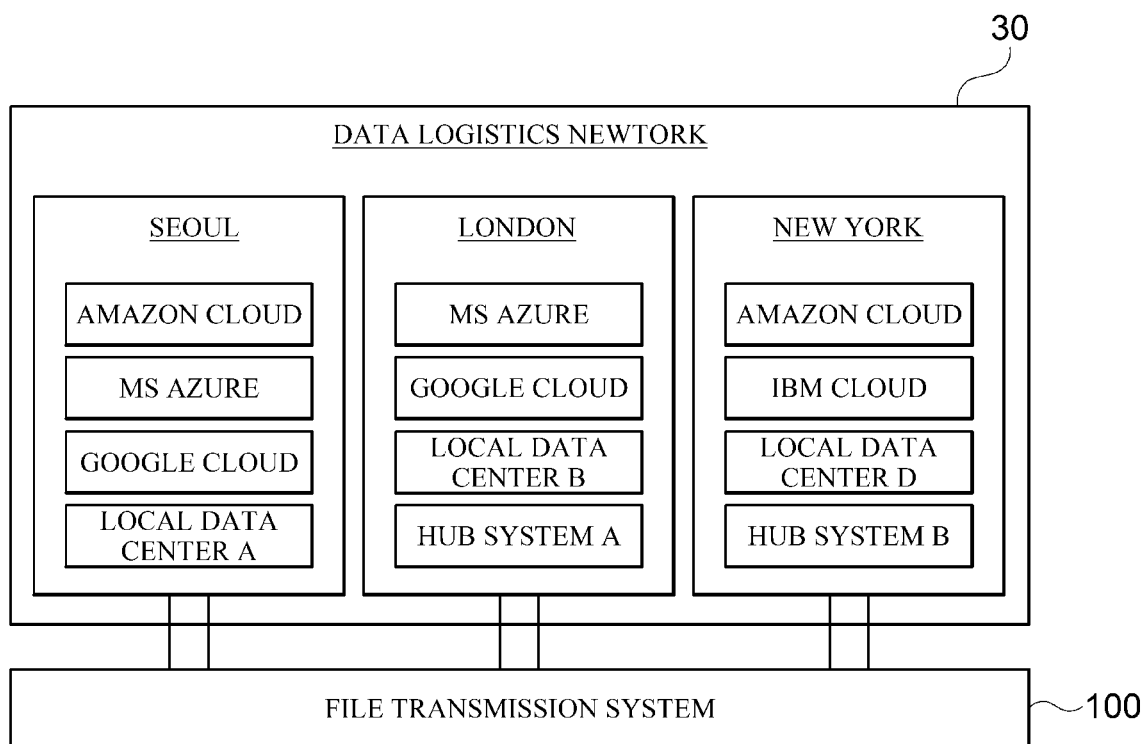

Referring to FIG. 2, the data logistics network 30 may group different types of data centers, hub systems, and cloud servers with respect to city, as a single data station and manages the same, and the file transmission system 100 may form a path by selecting a data center, a hub system, a cloud server, and the like, of the data station.

Specifically, the file transmission system 100 may determine to go through a data center (hub system, cloud server, etc.) of a pass-through group according to locations of the transmission side 10 and the reception side 20, a size or type of a file to be transmitted, whether a file is required to be encrypted, and the like, transmit data in series according to a transmission scheme, or transmit data in parallel through a plurality of data centers. Also, although subjects for managing the go-through data centers are different, the data centers may be included in the same path.

For example, FIG. 2 illustrates a data station determined on the basis of a city in the data logistics network 30.

That is, a data station in Seoul may include Amazon cloud, Microsoft (MS) Azure, Google cloud, and local data center A.

A data station in London may include MS Azure, Google cloud, local data center B, and hub system A, and a data station in New York may include Amazon cloud, IBM cloud, local data center D, and hub system B.

Accordingly, in the case of passing through the data station in London for file transmission between the transmission side 10 located in Seoul and the reception side 20 located in New York, the file transmission system 100 may establish a path for transmitting data between the transmission and reception sides 10 and 20 using the Amazon cloud in Seoul, the MS Azure in London, and the IBM cloud in New York.

It is also possible to include the data center and the hub system in the path.

For example, it is possible to establish a path through the local data center A in Seoul, the MS Azure in London, and the hub system B in New York.

That is, in the case of establishing a path, the data center, the local data center, the cloud server, and the hub system may be selected without any differentiation, and thus, and is not limited to any one thereof.

Hereinafter, for the purposes of description, an example will be described with reference to the data center as a pass-through apparatus between data transmissions.

In order to overcome a limitation in bandwidth that occurs when a large file is transmitted a long distance between data centers forming the data logistics network 30, the file transmission system 100 according to this embodiment splits a file into fragments and simultaneously transmits the fragments by way of a plurality of data centers at a time.

Therefore, although a user does not purchase an expensive bandwidth, a bandwidth is temporarily expanded by a large quantity using lines of the data centers dispersed all over the world at the time of transmission.

Hereinafter, a more detailed description will be given with reference to FIG. 3.

Figure 3:
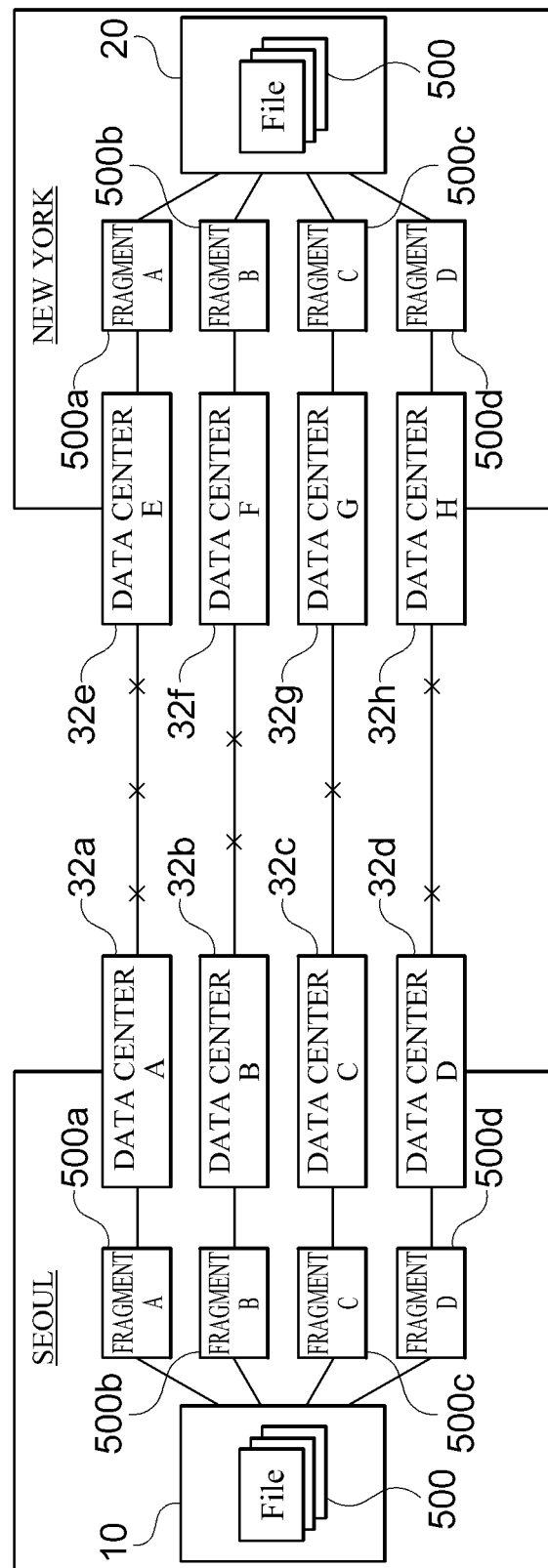
FIG. 3 illustrates a system configuration in which a file transmission method according to an embodiment of the present invention is performed.

FIG. 3 illustrates in more detail a situation in which data is transmitted between the transmission side 10 located in Seoul and the reception side 20 located in New York.

Referring to FIG. 3, in order to transmit a file, the file transmission system 100 according to the present invention may split the file into a plurality of fragments and transmit the file fragments in parallel.

A file 500 of the transmission side 10 may be split into four fragments and transmitted along respective paths, and the reception side 20 recombines the four file fragments and subsequently stores the file 500 in a memory.

The four split fragment files are respectively transmitted via the distributed data centers, and here, portions of the fragment files may arrive separately at the respective data centers and may immediately be transmitted to a next destination in real time. Therefore, it differs from the existing grid system and contents delivery network, which keeps a file as a whole and transmits the file upon request and differs from a transmission scheme of an e-mail, cloud, messenger, and the like, in which a file is uploaded to a relay server and subsequently received by a counterpart.

Specifically, fragment A 500*a* of the transmission side 10 located in Seoul may be transmitted, starting from a data center A 32*a* in Seoul to a data center E 32*e*, as a last data center, in New York via three data centers. Fragment B 500*b* may be transmitted from a first data center B 32*b* in Seoul to a data center F 32*f* in New York via two data centers. Fragment C 500*c* may be transmitted from a first data center C 32*c* to a data center G 32*g* via one data center.

Finally, fragment D 500*d* may be transmitted from a data center D 32*d* to reach a data center H 32*h* via two data centers.

When the above-mentioned file fragments arrive at the data centers of the reception side 20, they may be combined and reconfigured and stored in a memory device of the reception side 20.

Here, the file transmission system 100 which transmits the file recognizes geographical locations of a starting point of the transmission side 10 and a destination of the reception side 20 and a distance therebetween and searches for a plurality of data centers or hub systems near the starting point and the destination using a smart path search engine.

Hereinafter, a method of determining a path of a smart path search engine will be described in more detail.

Figure 4:
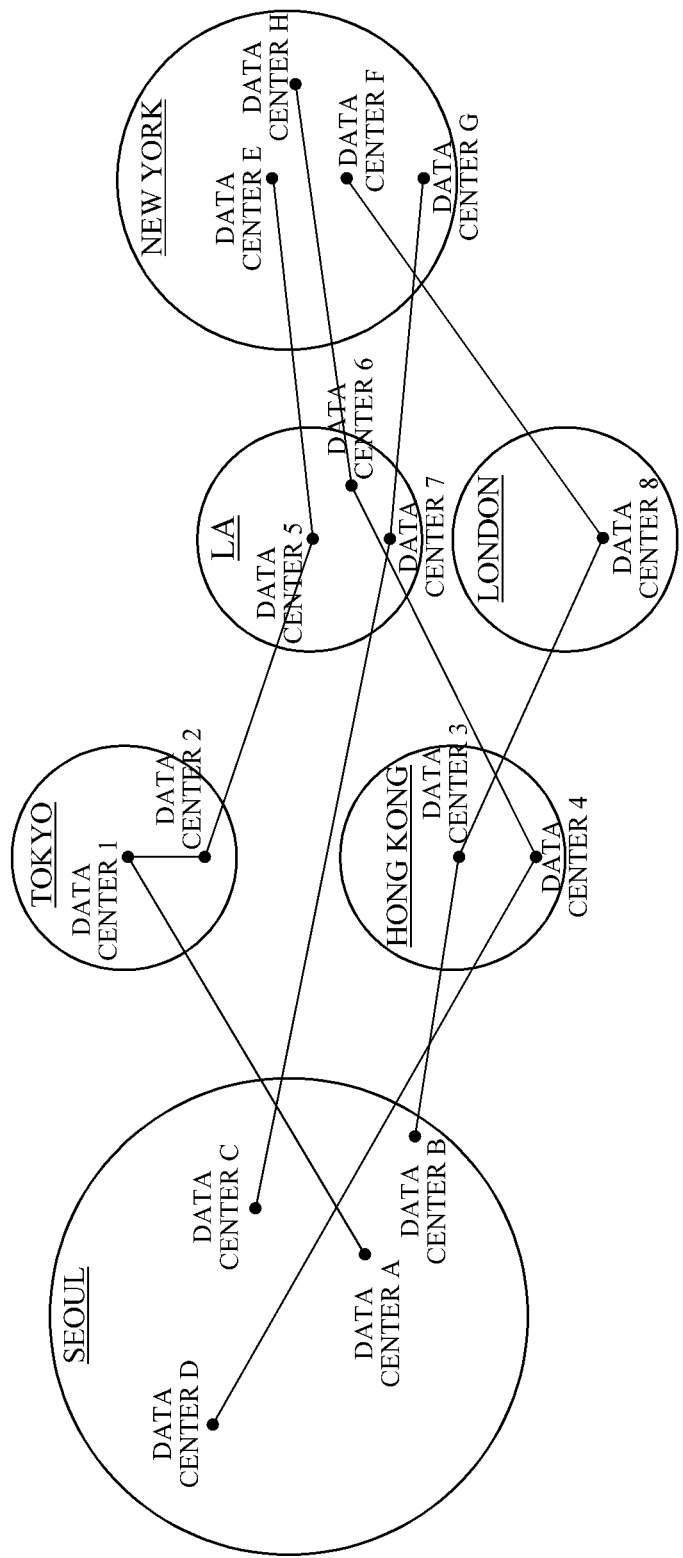
FIG. 4 illustrates transmission paths for a file transmission method according to an embodiment of the present invention.

FIG. 4 is a diagram illustrating a pass-through path between data centers according to FIG. 3 in detail.

Referring to FIG. 4, the file transmission system 100 recognizes state information of the data center of each city using the smart path search engine and forms a data transmission path in real time through various types of attribute information such as availability, security, protocol used for transmission, encryption algorithm, and the like, between data centers in the data logistics network 30 of the centers of the respective cities.

For example, in order to transmit a file to the data center E in New York, the data center A in Seoul transmits the file via a data center 1 and a data center 2 in Tokyo and a data center 5 in LA.

Here, a route between the data centers in Tokyo in the same area may be included, and it may also be possible to determine a path via the same data center for reasons such as a change in protocol, application of an encryption algorithm, security, and the like, according to demands from the transmission side 10.

In addition, the data center C in Seoul may transfer a file to the data center G in New York via the data center 7 in LA without passing through the data center in Tokyo.

That is, the file fragments according to the present embodiment may be separately transmitted via different data centers, and thus, there is no possibility that the entire file is extorted, and although some of the file fragments are extorted, it is not possible to combine the entire file, eliminating the possibility that partial information is leaked, thus increasing security by only the transmission scheme itself.

In addition, each data center may be determined according to a timing at which the file fragments transmitted along different paths arrive at the last data center. For example, data centers through which other fragments pass along a path may be determined with respect to an arrival timing of the fragment A, in case where there is some delay as the fragment A repeatedly passes through the data center in Tokyo according to security, the fragment C may pass through a data center having a lower transfer rate. Also, since the fragment D includes one more data center than the fragment C, the data center 4 and the data center 6 having a transfer rate higher than that of the data center 7 may be selected.

Further, an estimated file transmission time for each path when a plurality of searched data centers and hub systems are used may be measured and provided to the user, so that the user may directly select a desired path. Also, cost according to a billing system for each predetermined path may also be provided to the user.

For example, 1) a case where a file is transmitted in a distributed manner at a high speed by connecting one or more data centers or hub systems in parallel between a starting point and a destination, 2) a case where the file is transmitted at a high speed by connecting one or more data centers or hub systems in series between the starting point and the destination, 3) a case where the file is transmitted at a high speed by connecting a starting point and a destination in a one-to-one manner, or 4) a case where the file is transmitted at a standard speed additionally using a file transfer protocol (FTP), cloud, an e-mail, or the like, may be separately considered and determined and results thereof may be provided through a user interface.

Figure 5:
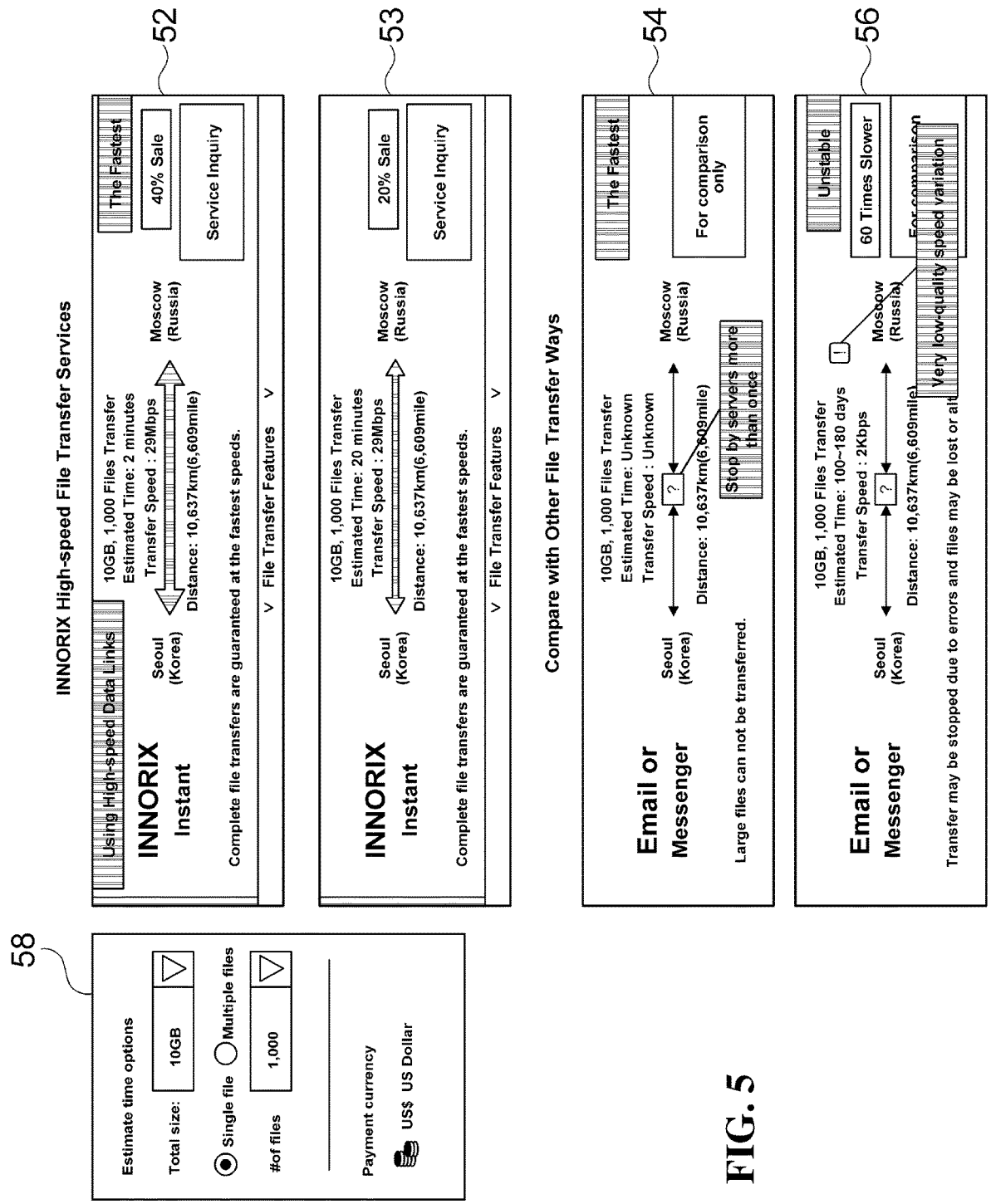
FIG. 5 illustrates a user interface for selecting a file transmission method according to an embodiment of the present invention.

In detail, referring to FIG. 5, in case where a user located in Seoul wants to send a single file of 10 GB or less to Moscow, menus may be created separately for cases 52 and 53 of transmitting a file through transmission paths using the file transmission system 100 according to the present embodiment, a case 54 of transmitting the file using an e-mail or a messenger, and a case 56 of transmitting the file using a cloud, and provided to the user, and the user may determine a method of transmitting a file to Moscow by selecting an appropriate transmission method in the provided menus.

A fastest transmission method may be labeled "The fastest" on the menu 52, and an unavailable transmission method may be labelled "Cannot transfer" on the menu 54 for easy recognition by the user. An available transmission but unstable method may be labelled "Unstable" on the menu 56.

In addition, referring to FIG. 5, the user interface may provide a menu 58 for selecting whether a file intended to be transmitted is a single file or a plurality of files as features of a file and a currency unit for calculating a transmission cost.

A menu for selecting a path may provide a transmission time, a transfer rate, and transmission cost (discount) information so that the user may more easily determine a transmission method.

When a transmission path is determined according to selection of the transmission method, the file transmission system 100 according to the present embodiment may determine a reference for splitting the file into a plurality of fragments for respective transmission paths.

When a specific transmission method is selected, the number of parallel transmission sessions and a split fragment size of the file of each transmission section of the transmission path are determined and the file is transmitted at a high speed using a bandwidth of each section as much as possible. The split fragments are converted into the original file at a destination.

Here, the number of sessions or the size of the fragments of the file may be determined in consideration of the following environmental variables.

1) Geographical characteristics of transmission sections such as long distance and short distance, etc.

2) Network characteristics such as bandwidth, delay time, loss rate, etc.

3) Characteristics of the file to be transferred such as the number of files, capacity, and file format 4) Characteristics of a file transmission section That is, in case where the file transmission system 100 according to the present embodiment transmits a file in series through a single path, the file transmission system 100 may split the file into a plurality of fragments and transmit the same in consideration of environmental variables of the single path, and in case where a local system of the transmission side 10 splits the file into a plurality of file fragments to transmit the same in parallel as illustrated in FIG. 3, a splitting reference for the file fragments at each transmission section may be determined.

In addition, required policies in each data center that transmits the split fragments may be different, and thus, compatibility with various networks may be considered during transmission. Therefore, in order to transmit the file without a change in structure of different security policies, a separate network, or a security policy, the file may be transmitted based on an HTTP protocol as a basic transfer protocol and by setting FTP, UDP, and HTTPS, etc.

Figure 6:
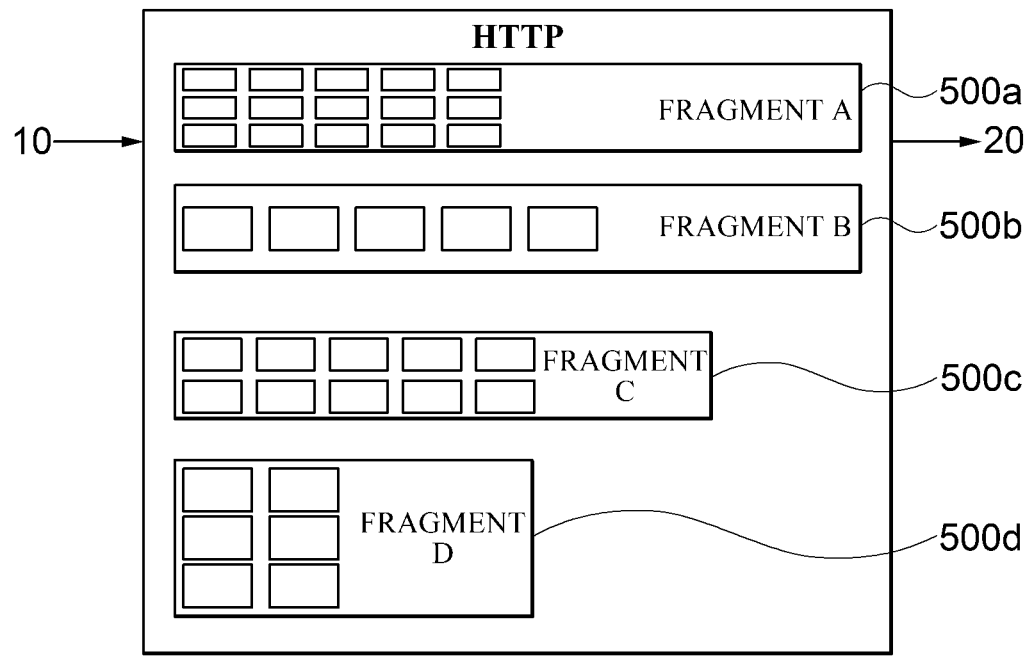
FIG. 6 is a diagram illustrating a file split for the respective transmission paths in a file transmission method according to an embodiment of the present invention.

Specifically, referring to FIG. 6, in the case of parallel transmission, the file fragments may be transmitted to the reception side 20 by determining the number of sessions of each transmission section regarding each file fragment and a size of each split file fragment. For example, the file fragment A 500a which is smaller than the file fragment B 500b may be transmitted through a larger number of sessions according to features of transmission sections, and the file fragment C 500c and the file fragment D 500d may be split to similar file sizes and transmitted by differentiating only the number of sessions according to a difference in size of the file fragments. Also, the number of sessions and fragments may be determined in consideration of environmental variables and may be changed in real time for each pass-through center to match an arrival timing of the file at the reception side 20.

Hereinafter, a method for extending a network bandwidth when transmitting a file to the first data center on the transmission path or transmitting a file from a last data center to the reception side 20, other than the transmission between the data centers, will be described.

The file transmission system according to the present embodiment may transfer the file fragments dividedly through a plurality of separate communication lines between the transmission side 10 and the first data center on the transmission path.

Specifically, in order to extend a bandwidth for the Internet connection, Internet lines of different communication companies may be connected in parallel to equipment or a separate device supporting the parallel connection of the lines may be used to transmit the file fragments.

Figure 7:
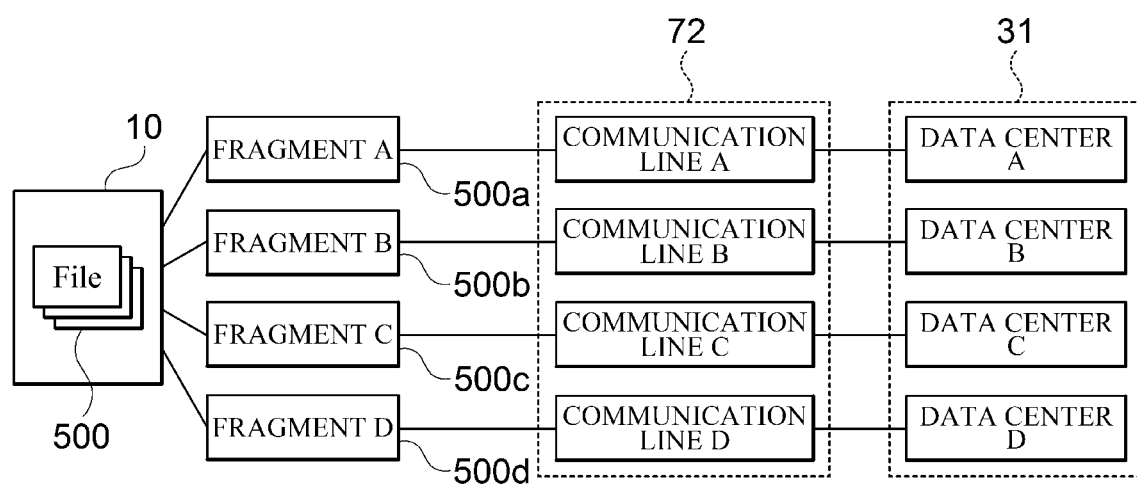
FIGS. 7 and 8 illustrate a transmission side configuration in which a file transmission method according to an embodiment of the present invention is performed.

For example, referring to FIG. 7, the file fragments split from the file 500 so as to be transmitted to four transmission paths in FIG. 3 may be transmitted to first data centers 31 through different communication lines 72, respectively.

The file fragment A 500a may be connected to a first data center A on the path by a communication line A, and the file fragment B 500b may be connected to the first data center B by a communication line B.

Generally, a local computer or a server of a transmission side establishes a system through a network of a single communication company for the sake of security and convenience and the system is configured as an enterprise network (internal network), and thus, a bandwidth of a communication line may be limited in transmitting file fragments through various data centers.

Therefore, in order to transmit a large file a long distance, the file transmission system 100 according to the present embodiment may be configured to include a separate device capable of using a separate communication line to transmit file fragments in parallel to the data centers, in addition to a communication line of a communication company providing the enterprise network.

Figure 8:
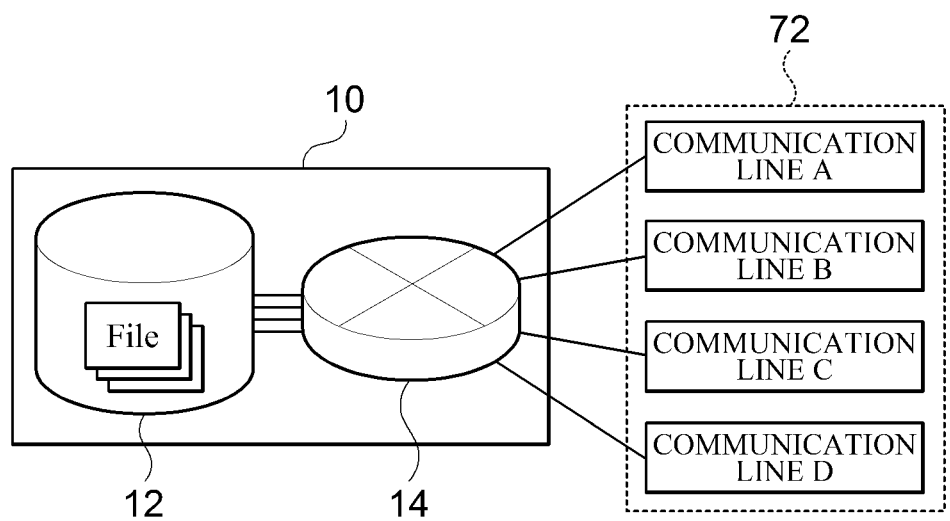

For example, as illustrated in FIG. 8, a data link device 14, which may be directly connected to a memory 12 for storing the file of the transmission side 10 and which may be connected to each communication line, may be provided to transmit the file fragments split for parallel transmission from the transmission side 10 to the first data centers through the randomly distributed Internet communication lines 72.

In this embodiment, the data link device 14, which is a separate hardware device, may transmit a large file at a high speed using a plurality of Internet lines when any storage or cloud is connected thereto. For example, the mass storage 12 of the transmission side 10 may be connected to an optical cable or multiple cables, a plurality of USB ports, and the Internet via the data link device 14 and merge or fragment all the files of the storage 12 to transmit the same through multiple lines.

The reception side 20 may also include a data link device between the last data center on the path and a memory of the reception side 20 by a plurality of communication lines to correspond to the transmission side 10, and may recombine the original file received through the plurality of communication lines through the data link device.

That is, in the present embodiment, the file transmission system 100 is configured such that a path is determined by combining different types of data centers, hub systems, clouds, and the like, and local-based communication for initially entering the determined path is also connected through a plurality of communication lines independent of the enterprise network, thereby providing a faster file transmission method.

Furthermore, the reception side 20 may also include a data link device configured between the last data center on the path and the memory of the reception side 20 by a plurality of communication lines to correspond to the transmission side 10.

Through the above process, when the transmission path is determined, the file transmission system 100 according to the present embodiment may transmit the file fragments in consideration of a transfer rate of each data center.

Figure 9:
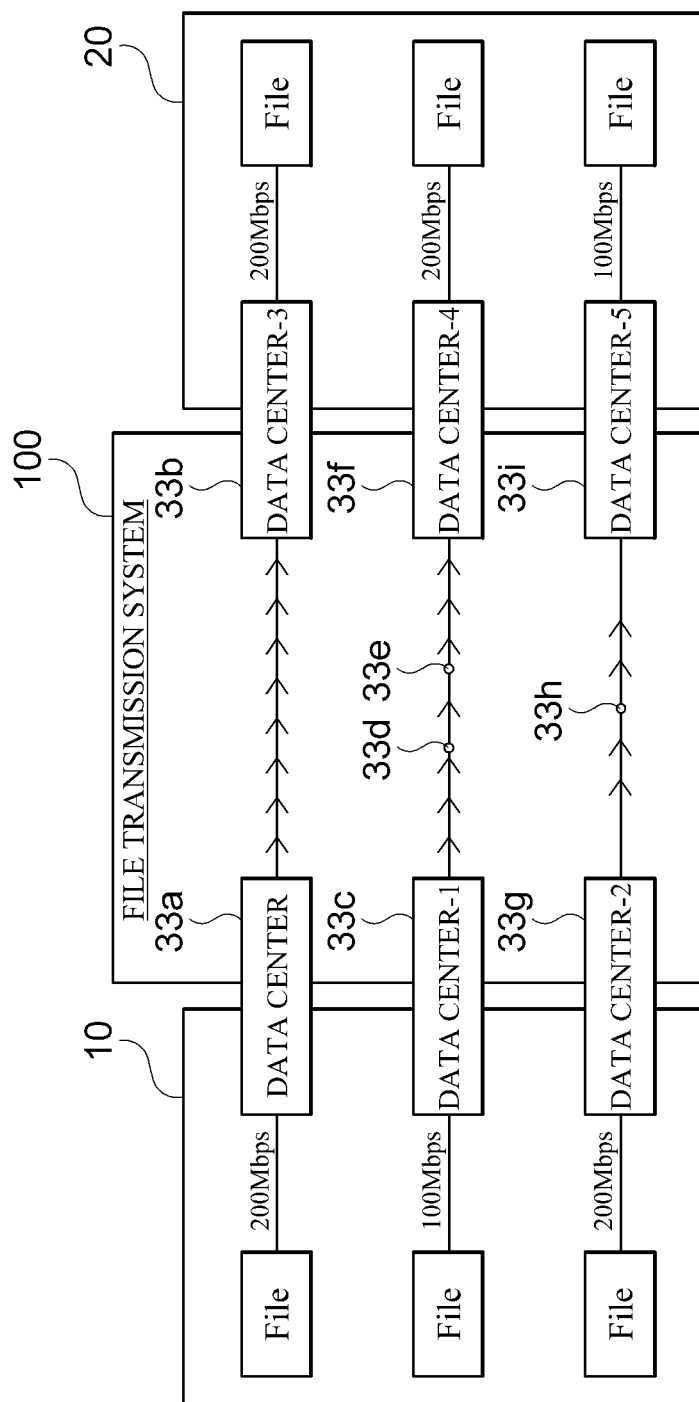
FIG. 9 is a diagram illustrating determining a transfer rate in a file transmission method according to an embodiment of the present invention.

Referring to FIG. 9, for example, when a file is transmitted using distributed data centers and hub systems, a transfer rate of the transmitted file may be determined according to a file transfer rate between the transmission side 10 and the reception side 20. A transmission cost and a transmission time provided through the menus as illustrated in FIG. 5 may be determined using the determined file transfer rate, and the smart path search engine may set transmission paths as illustrated in FIG. 4.

For example, when the file transfer rates of a data center 33a of the transmission side 10 and a data center-3 33b of the reception side 20 are equal, a file may be transmitted at the same speed in real time. A transfer rate of the data center-1 33c of the transmission side 10 and a transfer rate of a data center-4 33f of the reception side 20 may be compared, and if the transfer rate of the data center-4 33f is faster, the file may be transmitted in real time according to the transfer rate of the data center-1 33c.

Conversely, if a transfer rate of a data center-2 33g of the transmission side 10 is higher than a transfer rate of a data center-5 33i, the transmission side 10 may first terminate the transmission and transmit fragments cached in each system to a destination according to the transfer rate of the data center of the reception side 20 so that the transmission may be completed.

The transfer rate here may be determined in consideration of transfer rates of data centers 33d, 33e, and 33h positioned in the middle of the path, in addition to the data centers of the transmission and reception sides and a transfer rate more accurately calculated therethrough and an estimate time may be provided through the menus of FIG. 5.

In consideration of the transmission path and the file transfer rates of the data centers determined according to the above method, the file transmission system 100 may determine the transfer rate, enables real-time transmission of each file fragment, and adjust an arrival timing to minimize time delay of file recombination.

In addition, in the present embodiment, when a request for transferring a plurality of files equal to or greater than a reference is received, the file transmission system 100 may merge the plurality of files into a single file, re-split the merged file, and transmit the same to a transmission path determined through the merged file.

For example, in the case of a document file, the size of each file may be small but the number of files may be larger than the reference. In this case, splitting each file into fragments for transmission of the document file or reading and writing all the files to transmit each file in parallel as is may waste network resources and cause transmission delay.

Thus, in the present embodiment, when a plurality of files are stored in a plurality of storages in a distributed manner at a local level, it may be more effective for the file transmission system 100 to merge the files into a single file and split the file into file fragments or determine a splitting reference according to paths.

Figure 10:
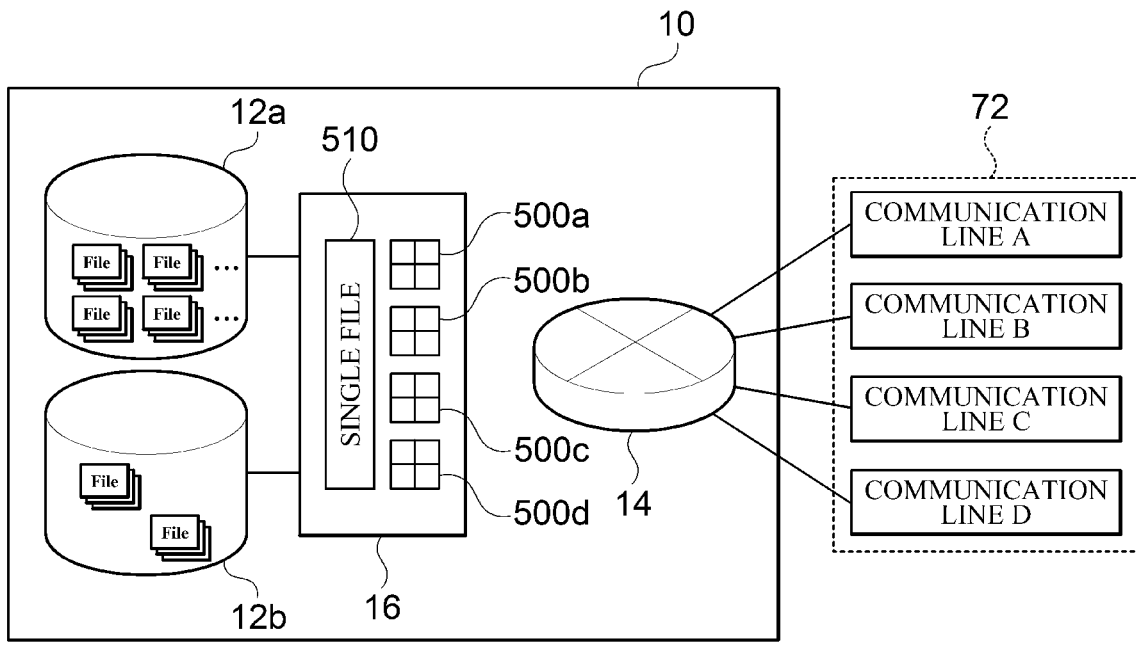
FIG. 10 is a diagram illustrating merging of files by a transmission side in a file transmission method according to an embodiment of the present invention.

To this end, referring to FIG. 10, the file transmission system 100 according to the present embodiment may further include a file merge device 16 in a local aspect and merge files in the case of low-capacity large file before splitting the file according to transmission paths during a transmission process.

When files distributed in a plurality of storages 12a and 12b are merged into a single file, files may be split into file fragments 500a, 500b, 500c, and 500d in the case of parallel transmission according to a transmission path determined based on a single file 510. Further, in order to transmit the file fragments to the first data center as mentioned above, the data link device 14 may use different types of communication lines 72. This improves a rate lowered due to ineffective use of an I/O and a network in transmitting a large low-capacity file, optimizing file transmission up to a limit speed of equipment.

Figure 11:
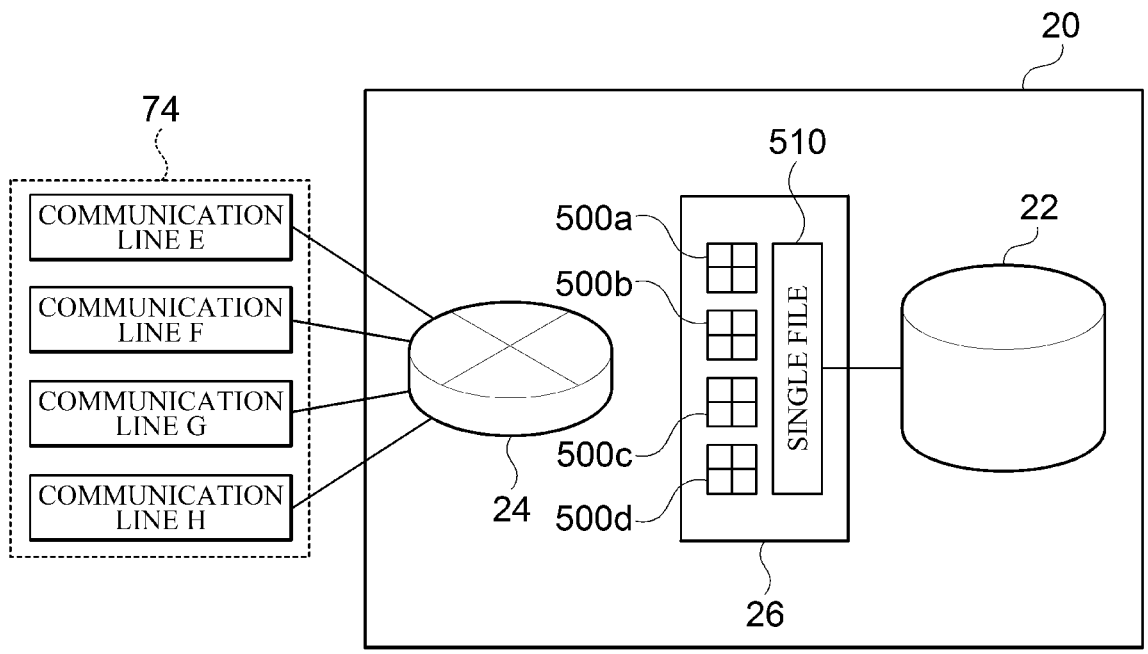
FIG. 11 is a diagram illustrating merging of files by a reception side in a file transmission method according to an embodiment of the present invention.

Referring to FIG. 11, the reception side 20 may also receive the file fragments received by the plurality of communication lines 74 through the data link device 24, and a file merge device 26 may merge the file fragments 500a, 500b, 500c, and 500d into a single file 510 again through a merging rule of the transmission side 10, reconfigure the same, and subsequently store the file as a plurality of low-capacity files in a storage 22.

Here, merging of the files and splitting the file according to transmission paths may be performed by reading only a portion required for transmission by paths from the memory, only a portion of the storage device may be used and use efficiency of the entire equipment may be increased.

The above-described file transmission system 100 according to the present embodiment may further increase security of file transmission in that the file is first split into file fragments so as to be transmitted in parallel, in that the files are secondly split into file sessions according to transmission sections when transmission paths are determined, and in that the transmission sections include different types of data centers.

Figure 12:
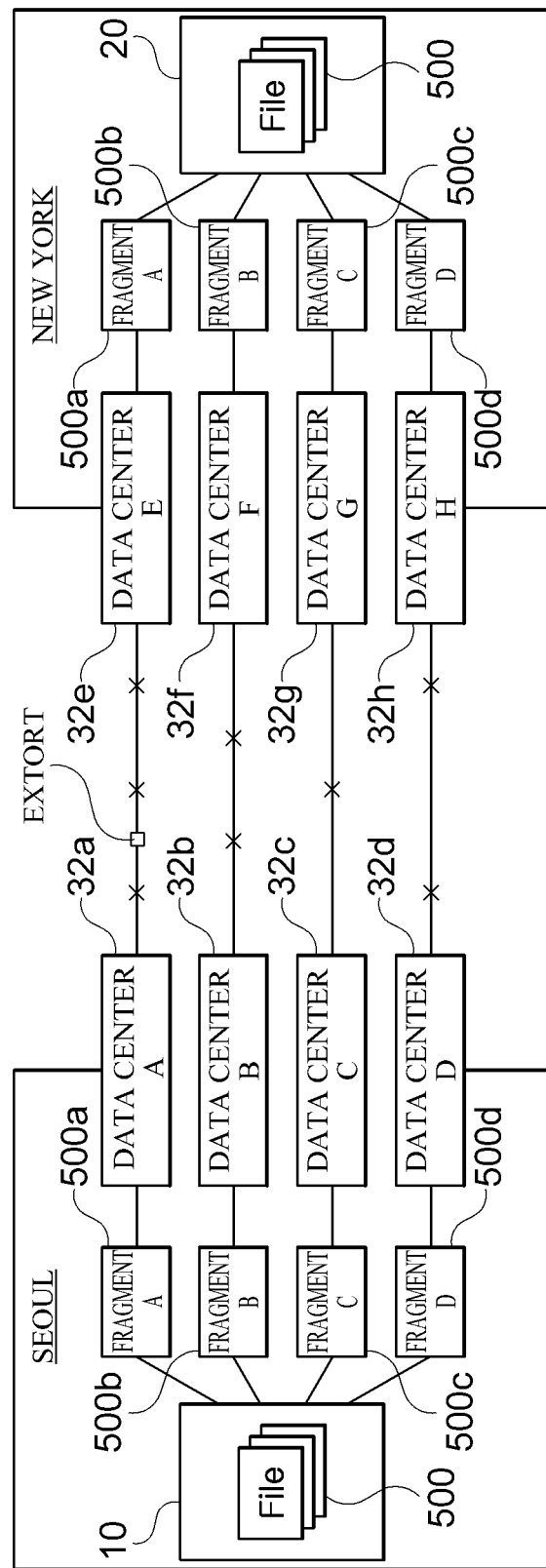
FIG. 12 is a diagram illustrating file extortion in a file transmission method according to an embodiment of the present invention.

Referring to FIG. 12, in the file transmission process according to FIG. 3, since one file is basically split into a plurality of fragments and randomly transmitted to a plurality of lines in a distributed manner during a file transmission process, even through one line is extorted, complete information of the file may be protected, guaranteeing security.

Further, when the plurality of file fragments are split, if a file combination rule is additionally created as a separate encrypted file and is included in a certain file fragment and transmitted, even through a plurality of files transmitted in a portion of a specific transmission path are extorted, the files cannot be combined unless the combination rule is extorted, further increasing the security of the transmitted file.

Additionally, it is also possible to encrypt the file before transmission through the data center.

Figure 13:
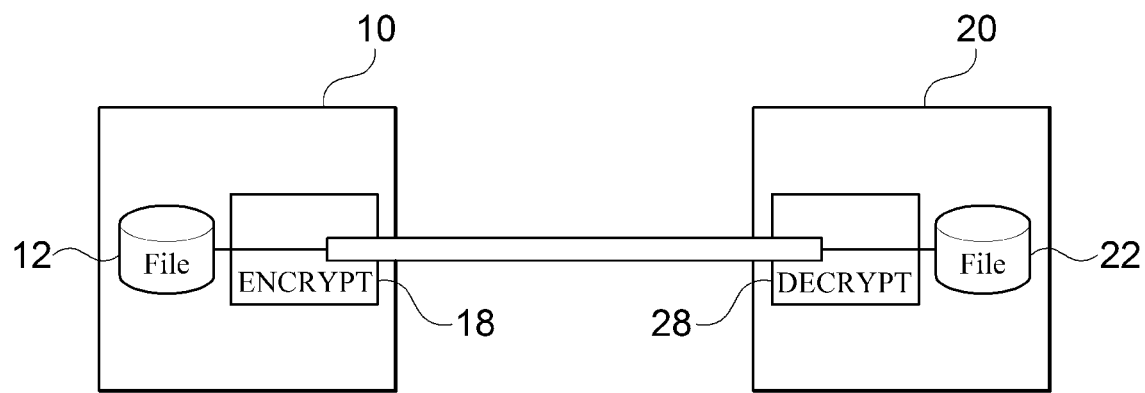
FIG. 13 is a diagram illustrating encryption of a file in a file transmission method according to an embodiment of the present invention.

Referring to FIG. 13, the file transmission system 100 according to the present embodiment includes an encryption/decryption device including a file encryption module 18 and a decryption module 28 respectively on the transmission side 10 and the reception side 20 of the file in the local aspect.

That is, all the fragments may be encrypted by a separate encryption algorithm at the starting point before transmission and decrypted at the destination. In this case, in order to shorten an encryption/decryption time of the file, the starting point may encrypt each split file fragment and transmit the same, and thus, as illustrated in FIG. 12, even though data of a specific line is extorted on the transmission paths, since only the encrypted fragment is obtained, it is impossible to decrypt the data.

Next, in the destination, each fragment is decrypted and reconfigured as the original file, thereby reducing a waiting time required for the encryption/decryption.

Figure 14:
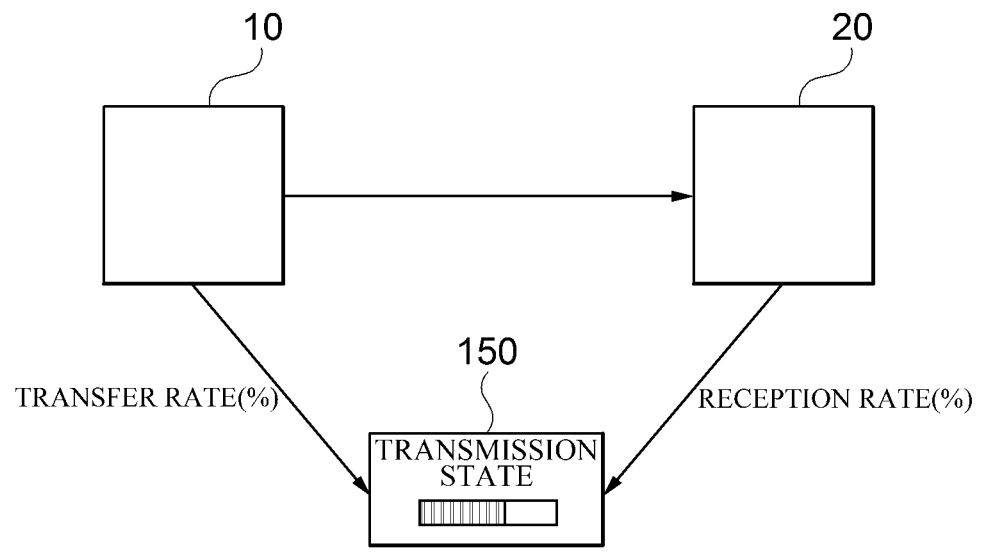
FIG. 14 is a diagram illustrating monitoring of a transmission state in a file transmission method according to an embodiment of the present invention.

Referring to FIG. 14, the file transmission system 100 according to the present embodiment may also include a separate device 140 configured to monitor transmission to provide information regarding a transmission state of the file to the user. Here, it is also possible to verify an actual transmission state by comparing the transmission states of both sides, apart from monitoring the transmission state through file processing information of either the existing transmission side 10 or the reception side 20.

Furthermore, it is possible to allow all the third parties (users) within the file transmission system 100 according to the present embodiment, as well as the transmission side 10 and the reception side 20, to share the file transmission state together with utilization state information of the data centers to ensure reliability of the file transmission state. That is, the user may monitor the transmission state information from separate equipment, rather than from transmission equipment, in real time, and when transmission is completed, transmission completion may be informed to all the starting point equipment, the destination equipment, and the user, whereby transmission denial of a receiver may be prevented and recorded transmission may be retrieved even after transmission is completed.

Hereinafter, a specific configuration of the file transmission system 100 according to the present embodiment and a file transmission method thereof will be described with reference to the flowcharts of FIGS. 15 to 21.

Figure 15:
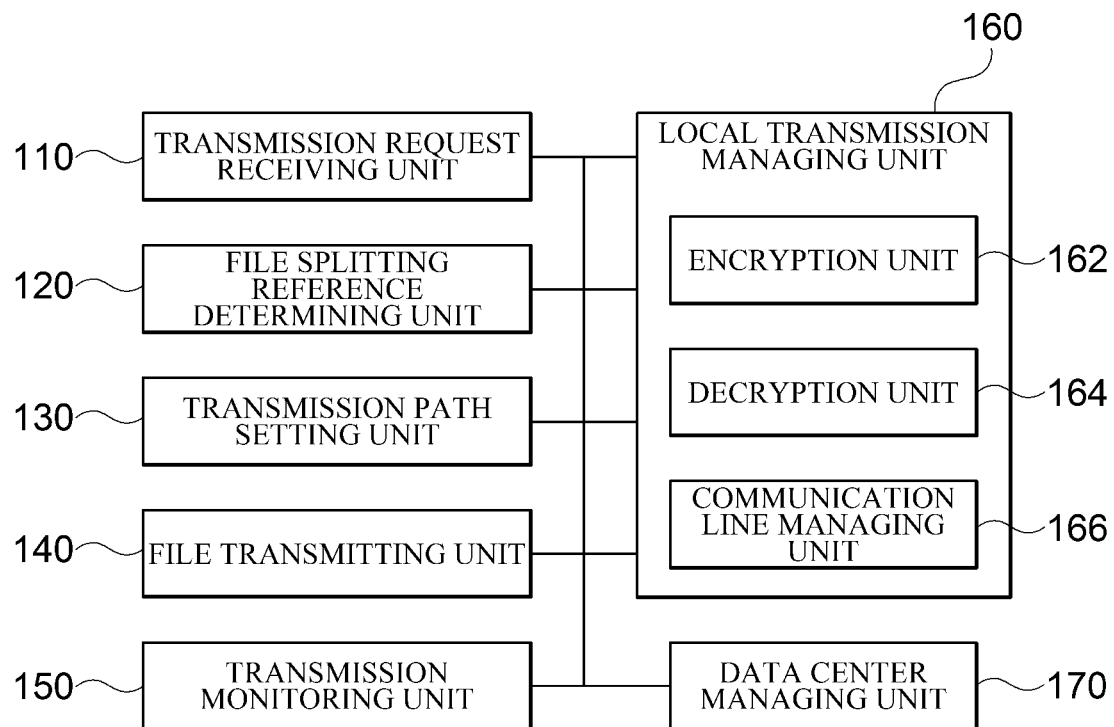
FIG. 15 is a diagram illustrating a system configuration in which a file transmission method according to an embodiment of the present invention is performed.

Referring to FIG. 15, the file transmission system 100 according to the present embodiment includes a data center managing unit 170 including a smart path search engine, which is for managing a data center, managing each data center, a local transmission managing unit 160 managing a file in a local aspect, and modules 110, 120, 130, 140, and 150 for receiving a user instruction for transmitting a file and performing transmission.

Figure 16:
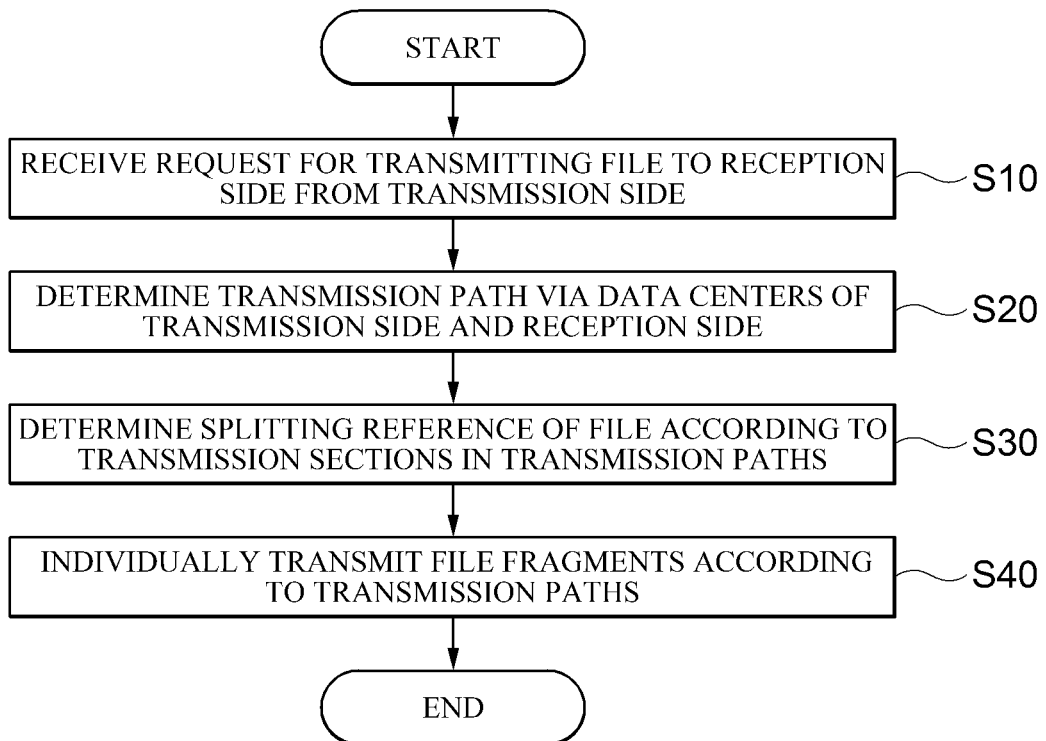
FIGS. 16 to 21 are flowcharts illustrating a file transmission method according to an embodiment of the present invention.

Referring to FIG. 16, a transmission request receiving unit 110 receives a request for transmitting a file to the reception side 20, from the transmission side 10 (S10).

Next, a transmission path setting unit 130 sets a transmission path for transmitting the file via the data center present between the transmission side 10 and the reception side 20 (S20).

When the transmission path is set, a file splitting reference determining unit 120 determines a splitting reference used for splitting the file into a plurality of fragments for respective transmission paths (S30).

The file transmission unit 140 separately transfers the file fragments split according to the splitting reference along the transmission path (S40).

In this case, the transmission path may be determined to include a plurality of different data centers, hub systems, cloud servers, and the like, as pass-through locations, and the data centers may be classified on the basis of locations where the data centers are located.

Therefore, the transmission path setting unit 130 determines a data center of an area through which the file is transmitted. In addition, the transmission path setting unit 130 may determine a data center of the pass-through area according to geographical locations of the transmission side 10 and the reception side 20 and a distance therebetween.

In addition, in the present embodiment, the transmission path setting unit 130 sets a plurality of transmission paths for respective pass-through areas, and the file transmission system 100 may further include a list providing unit (not shown) providing a list of the plurality of determined paths according to transmission time and transmission cost.

That is, the list providing unit may provide the paths determined as illustrated in FIG. 5 as a transmission path list according to transmission cost, transmission time, and the like, and receive a transmission method from the user therethrough.

In this embodiment, a file transmitting unit 140 may transmit the file fragments using a hyper text transfer protocol (HTTP). Policies requested by the respective data centers may be different, and thus, in order to support compatibility with various networks in transmission and transmit a file to structures having different security policies without additionally changing networks or security policies, the HTTP protocol may be basically used to increase compatibility between data centers.

In addition, during the above transmission process, a transmission monitoring unit 150 may compare a transmission state of the file fragments from the transmission side 10 with a reception state of the file fragments at the reception side 20 and provide information regarding the transmission state of the file according to comparison results.

In addition, a data center managing unit 170 provides information such as current transmission states of the data centers, a requested protocol, the degree of security, and the like, and accordingly, the transmission path setting unit may set a path.

Furthermore, the file transmitting unit 140 may perform more efficient transmission in cooperation with local devices.

Hereinafter, a local transmission managing unit 160 will be described.

The local transmission managing unit 160 may include an encryption unit 162, a decryption unit 164, and a communication line managing unit 166.

Figure 17:
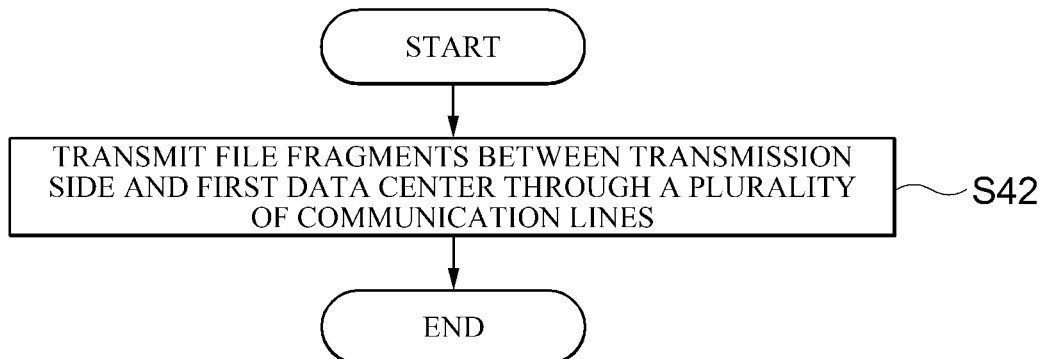
Figure 18:
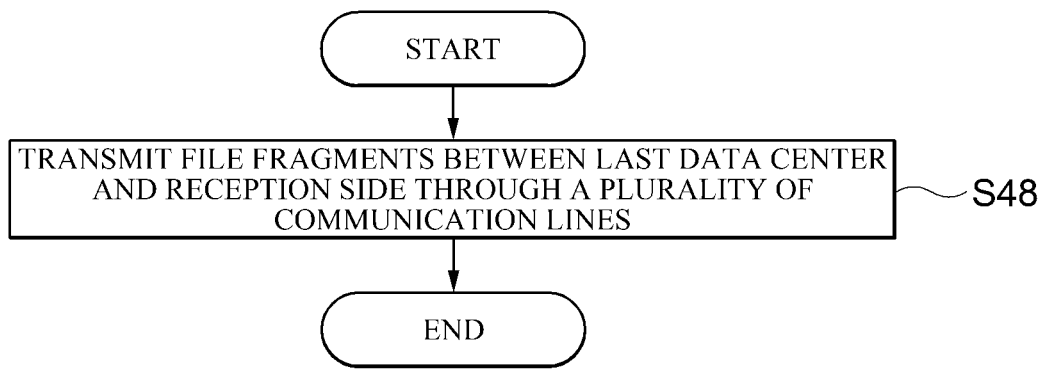

Referring to FIGS. 17 and 18, the communication line managing unit 166 causes file fragments to be transmitted through a plurality of communication lines between the transmission side 10 and a first data center on the transmission path through the data link device described above (S42).

Also, in the case of transmitting the file fragments between the last data center on the transmission path and the reception side 20, the communication line managing unit 166 causes the file fragments to be transmitted dividedly through a plurality of separate communication lines (S48).

Here, as described above, the first data center may be the data center of the area where the transmission side 10 is located, and the last data center may be the data center of the area where the reception side 20 is located.

That is, the local transmission managing unit 160 may manage file transmission/reception between the first and last data centers and the local storage.

Figure 19:
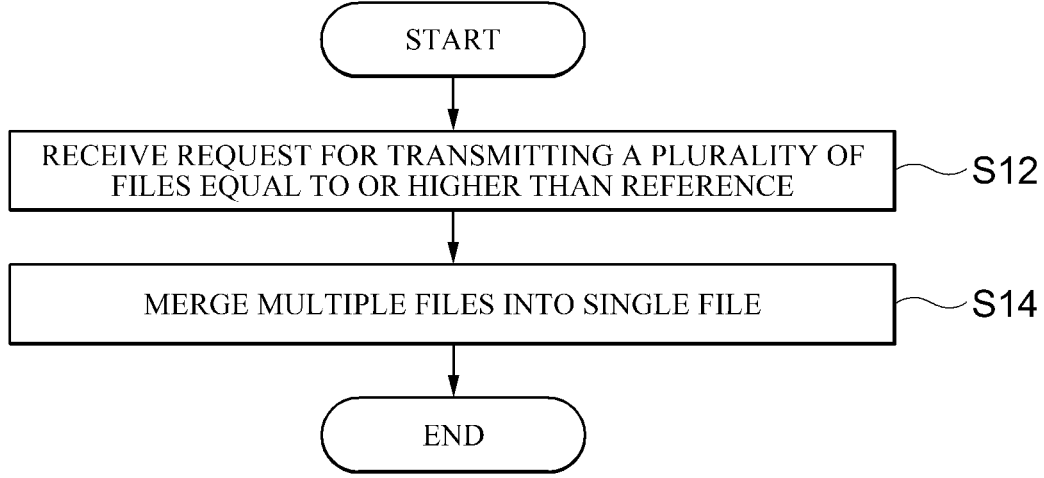

Referring to FIG. 19, in the present embodiment, when a request for transmitting a plurality of files equal to or greater than a reference is received (S12), the transmission request receiving unit 110 may merge a plurality of files into a single file through a file merge unit (not shown) (S14).

Figure 20:
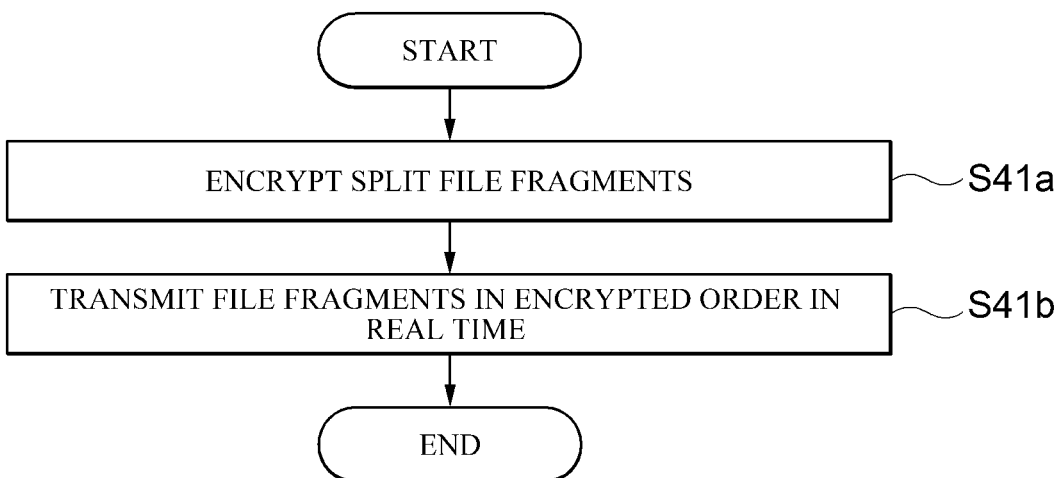

Referring to FIG. 20, the encryption unit 162 may encrypt the split file fragments before transmission (S41a), and the file transmitting unit 140 transmits the encrypted file fragments to the first data center. Here, the encrypted file fragments may be transmitted in real time in encrypted order to perform file transmission without delay.

Figure 21:
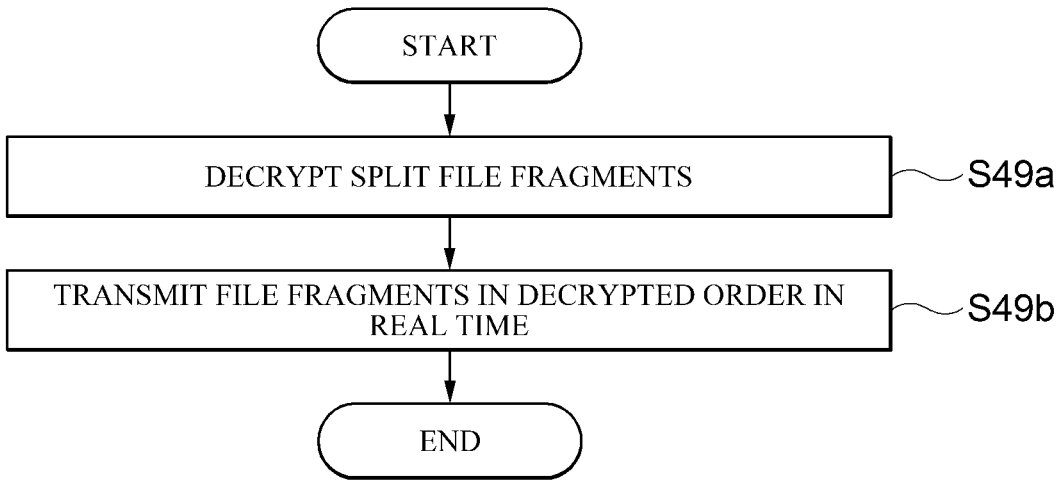

Conversely, referring to FIG. 21, the decryption unit 164 decrypts the split file fragments (S49a), and the file transmitting unit 140 decrypts the encrypted file fragments received from the last data center on the transmission path and transmits the same to the reception side 20 (S49b).

Transmission to the reception side 20 may also be made in real time in decrypted order to prevent transmission delay due to decryption.

As described above, according to the configuration of the present invention described above, the files are split into several fragments, and the fragments are simultaneously transmitted to a plurality of networks in a distributed manner, whereby security may be strengthened and a bandwidth may be temporarily expanded to enhance a transfer rate.

Also, the user may transmit a large-capacity file safely and perfectly at low cost by utilizing a plurality of line providers nearby at the time of transmission and the data centers dispersed in the world without having to purchase a high-priced bandwidth.

Although a few exemplary embodiments have been shown and described, it will be appreciated by those skilled in the art that changes may be made in these exemplary embodiments without departing from the principles and spirit of the invention, the range of which is defined in the appended claims and their equivalents.

Accordingly, the exemplary embodiments of the present invention are provided to explain the technical spirit f the present invention but not to limit such spirit. The scope of the technical spirit of the present invention is not limited by the exemplary embodiments of the present invention. The scope of protection of the present invention should be interpreted by the claims below, and all technical spirits which are in the sale scope would be interpreted as being included in the scope of right of the present invention.

What is claimed is:

1. A file transmission method comprising:
receiving a request for transmitting a file to a reception side from a transmission side;
receiving a selection of transmission path through a user interface providing a transmission cost information;
merging the plurality of files into a single file;
setting transmission paths for transmitting the single file via data centers present between the transmission side and the reception side according to the selection of transmission path;
determining a splitting reference used for splitting the single file into a plurality of file fragments for the respective transmission paths; and
individually transmitting the plurality of file fragments split according to the splitting reference along the transmission paths,
wherein each of the plurality of file fragments is split into a plurality of file sessions according to each transmission section of the transmission path to match an arrival timing, and the plurality of split file sessions are transmitted along the transmission path.

2. The file transmission method of claim 1, wherein the data centers are classified based on areas where the data centers are located, and
the setting of the transmission paths includes determining data centers of pass-through areas to transmit the single file.

3. The file transmission method of claim 2, wherein the setting of the transmission paths includes determining the data centers of the pass-through areas according to geographical locations of areas where the transmission side and the reception side are located and distances between the areas.

4. The file transmission method of claim 2, wherein the setting of the transmission paths includes setting a plurality of transmission paths for the respective pass-through areas, and
wherein the file transmission method further comprises:
providing a list of the plurality of set transmission paths according to transmission time and transmission cost.

5. The file transmission method of claim 1, wherein the individually transmitting includes transmitting the plurality of file fragments using a hyper text transfer protocol (HTTP).

6. The file transmission method of claim 1, wherein
The individually transmitting includes transmitting the plurality of file fragments dividedly through a plurality of separate communication lines when transmitting the plurality of file fragments between the transmission side and a first data center on the transmission paths or between a last data center on the transmission paths and the reception side.

7. The file transmission method of claim 6, wherein the first data center is a data center of an area where the transmission side is located, and the last data center is a data center of an area where the reception side is located.

8. The file transmission method of claim 7, further comprising:
encrypting the plurality of split file fragments,
wherein the individually transmitting further includes transmitting the plurality of encrypted file fragments to the first data center.

9. The file transmission method of claim 8, further comprising:
decrypting the plurality of encrypted file fragments,
wherein the individually transmitting further includes decrypting the plurality of encrypted file fragments transmitted to the last data center on the transmission paths and transmitting the plurality of decrypted file fragments to the reception side.

10. The file transmission method of claim 1, further comprising:

comparing a transmission state of the plurality of file fragments from the transmission side and a reception state of the plurality of file fragments at the reception side and providing information regarding the transmission state of the single file according to a comparison result.

11. The file transmission system of claim 1, wherein the transmission side data station is further configured to compare a transmission state of the plurality of file fragments from the transmission side and a reception state of the plurality of file fragments at the reception side and provide information regarding the transmission state of the single file according to a comparison result.

12. A file transmission system comprising:
a transmission side data station comprising at least one server and at least one memory, wherein the transmission side data station is configured to:
receive a request for transmitting a plurality of files to a reception side from a transmission side;
receive a selection of transmission path through an user interface providing a transmission cost information;
merge the plurality of files into a single file;
set transmission paths for transmitting the single file via data centers present between the transmission side and the reception side according to the selection of transmission path;
determine a splitting reference used for splitting the single file into a plurality of file fragments for the respective transmission paths; and
individually transmit the plurality of file fragments split according to the splitting reference along the transmission paths,
wherein each of the plurality of file fragments is split into a plurality of file sessions according to each transmission section of the transmission path to match an arrival timing, and the plurality of split file sessions are transmitted along the transmission path.

13. The file transmission system of claim 12, wherein
the data centers are classified based on areas where the data centers are located, and
the transmission side data station determines data centers of pass-through areas to transmit the single file.

14. The file transmission system of claim 13, wherein the transmission side data station is further configured to:
set a plurality of transmission paths for the respective pass-through areas; and
provide a list of the plurality of set transmission paths according to transmission time and transmission cost.

15. The file transmission system of claim 14, wherein the transmission side data station is further configured to:
encrypt the plurality of split file, fragments; and
transmit the plurality of encrypted file fragments to the first data center.

16. The file transmission system of claim 15, further comprising:
a reception side data station comprising at least one server and at least one memory,
wherein the reception side data station is configured to decrypt the plurality of encrypted file fragments received from the last data center on the transmission paths.

17. The file transmission system of claim 13, wherein the transmission side data station is further configured to transmit
the plurality of file fragments dividedly through a plurality of separate communication lines when transmitting the plurality of file fragments between the transmission side and a first data center on the transmission paths or between a last data center on the transmission paths and the reception side.

* * * * *